March 31, 1931.  M. E. HARTZLER ET AL  1,798,467
PAVEMENT MARKER
Filed Sept. 26, 1928
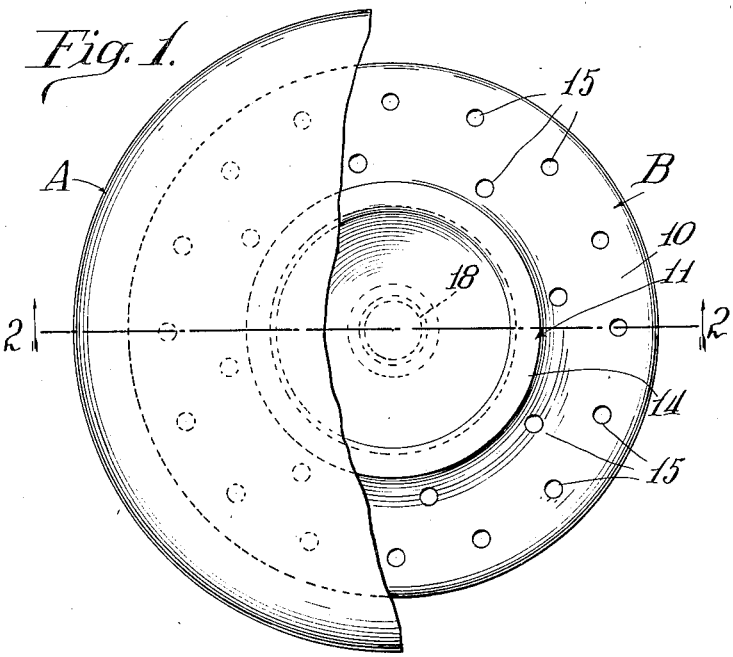
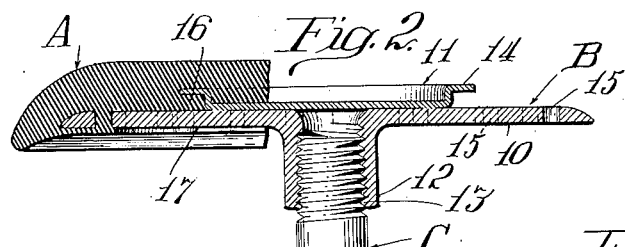
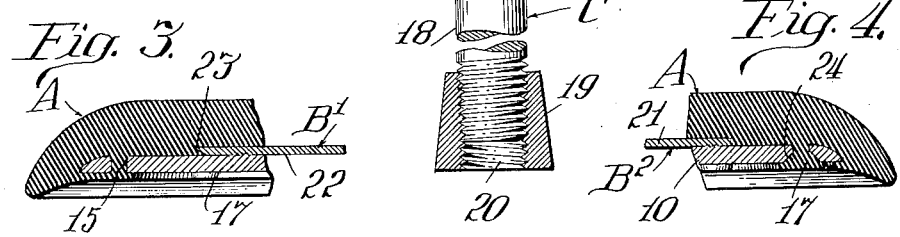
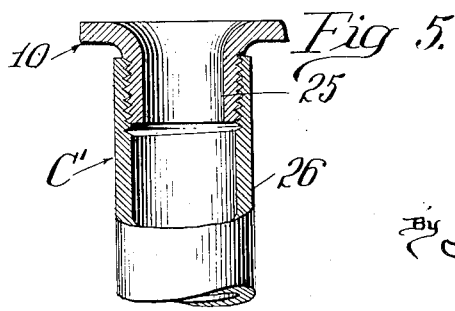
Inventors
Melvin E. Hartzler
and Edgar P. Romilly
By Thomas H. Ferguson
Attorney Patented Mar. 31, 1931

1,798,467

UNITED STATES PATENT OFFICE

MELVIN E. HARTZLER, OF DOWNERS GROVE, AND EDGAR P. ROMILLY, OF CHICAGO, ILLINOIS

PAVEMENT MARKER

Application filed September 26, 1928. Serial No. 308,490.

The present invention relates to pavement markers of the kind that are set in the surface of the pavement to mark off lines or zones for the guidance of pedestrians and drivers who use the highways or other passage-ways where the pavement is laid. The invention is directed more particularly to the production of markers having metal cores and rubber envelopes.

One object of the invention is to improve the attachment of the envelope to the core. To this end we employ several novel features. One of these is a perforated head or core preferably in the form of a plate. By the use of such perforations the rubber of the envelope during the molding process passes through the perforations from one side of the core to the other. If the perforation in any given instance is located at a point where the rubber envelope lies on both sides of the core, as, for example, near the periphery, then the two parts of the rubber envelope are tied together by these tendrils or bars of rubber that extend from one mass of rubber on one side of the core through the perforation to the mass of rubber on the other side of the core. If the rubber projected through the perforation does not meet a mass of rubber on the other side of the core then there is a collection of the rubber against the mold at the far end of the perforation and thus a sort of head or retaining mass is formed. When these heads are vulcanized, as the whole rubber envelope will be before leaving the molds, it forms a sort of anchor, held to the main body of the envelope by a tendril-like line or stem extending through the perforation. In other words, there is formed a sort of rubber rivet.

Another feature tending to produce a better union of the rubber envelope with the metal core is the employment of an auxiliary plate that has edges which lie above the level of the main portion of the core and thus interpose walls which resist the movement of the envelope with respect to the core. These edges may take different forms, some offering resistance in one way and others in other ways. Preferably the shape is such as to offer resistance both in the direction of the plane of the head and in directions transverse thereto. For the latter purpose the auxiliary plate is preferably provided with an overhanging flange or ledge beneath which the rubber passes while the marker is being molded. Thus, the metal core and the rubber envelope are firmly locked together in the finished product.

Another object of the invention is to produce a core which shall be strong and durable and at the same time economical to manufacture. To this end we make the core out of two punchings and connect them together, preferably by welding. The two plates which constitute the punchings, preferably have the form of the general contour of the marker. The main supporting plate has a boss formed on its under side by punch press operations. Where the contour of the plates is circular, this boss is usually located at the center of the main plate. The boss is shaped to provide for connection to an anchor. Usually the connection is a threaded one and the boss is threaded to suit the threaded end of the anchoring device. The punching of the main plate to form the boss leaves a central hole or bore through the boss, the axis of which extends at right angles to the plane of the main plate. This opening is closed by the secondary plate which is secured to the upper side of the main plate about the opening, preferably by welding. The second or auxiliary plate provides means at its periphery for resisting the bodily movements of the rubber envelope with respect to the head or core as previously mentioned.

Other objects and features of the invention will appear in the following detailed description which covers the preferred form of the invention and certain minor modifications, all fully illustrated in the accompanying drawing to which reference should be had. For the scope of the invention attention is directed to the appended claims.

Referring to the drawing, Fig. 1 is a top plan view of a marker constructed in accordance with the present invention, a portion of the rubber envelope being broken away to show the structure of the embraced core; Fig. 2 is a vertical section of the same, the plane of section being indicated by the line 2—2 of Fig. 1; Figs. 3 and 4 are fragmentary views illustrating modified core constructions, Fig. 4 illustrating furthermore a modified form of aperture through which the rubber of the envelope is pressed during manufacture; and Fig. 5 shows a modification of the boss of the marker in association with a tubular anchoring device. Throughout these views like characters refer to like parts.

Referring at first to the preferred form of the invention, illustrated in Figs. 1 and 2, A designates the rubber envelope, B, the metal core, and C, the anchoring device. As here illustrated the general form of the marker is circular, but it will be apparent that the same might depart from this circular outline and still embody some or all of the features of the invention.

The envelope A preferably entirely covers the upper surface of the core B with a substantial thickness so as to provide a good wearing face capable of withstanding the usual pavement wear for a long period of years. The value of rubber for pavement purposes has already been well established by long continued experiments in this country and abroad. The upper surface of the rubber is curved and terminates at its periphery in a relatively thin pavement-contacting lip which makes a close joint with the pavement notwithstanding minor irregularities in the surface of the same. The rubber is a good resilient rubber and because of this fact takes up the shock of the traffic over it and thus reduces the shock transmitted to the core B and thereby lengthens the time the marker remains tight in the pavement.

Of course, the extent of the core embraced by the envelope A may be considerably varied. In some instances it may be desirable to cover most of the under side of the core and in other instances only a portion of it. These are matters which are left to the judgment of the designer. Besides employing a high-grade rubber we also preferably give it an orange color. The latter is produced by introducing a chrome pigment obtained from lead chromate or otherwise. Sometimes vegetable or other mineral matter is introduced for this purpose. Of course, the rubber may vary in composition but it is desirable to have high-grade rubber which will withstand traffic wear for a number of years. The choice of such a rubber permits the same to be thin enough on the upper side of the core to produce a minimum of difference in elevation between the top of the marker and the surrounding pavement. Having the rubber of a high grade also enables the peripheral lip to be thin and to more readily conform to slight irregularities in the pavement and to wear a long time, while maintainng such close fit. The color of the envelope might also be varied, but chrome orange has been found by test to be a very satisfactory color for use in all conditions of weather. It also lends itself well to use upon pavements where it is likely to become more or less obscured by the dirt of the road. The chrome orange color gives, we understand, the best visibility.

The core or head B comprises a main supporting member 10 and auxiliary or secondary member 11. These members are preferably metal punchings. The basic member 10, in the embodiment illustrated, is circular and provided with a central boss 12. The original plate, out of which the member is made, is subjected to punching operations to form the boss 12. This leaves a central opening 13 through the boss. This opening is closed by the member 11. The latter is also preferably struck up into the dish shape illustrated. According to this preferred form, member 11 has a peripheral flange 14 spaced from the member 10 when the parts are assembled. The members 10 and 11 are suitably secured together in any desired way. Preferably they are welded together. The member 10 is also provided with a number of perforations 15. These may be positioned at various points, the circular arrangement illustrated being typical.

The envelope A is placed over the core B by placing the rubber in a mold about the core and vulcanizing it under pressure. During such operation, the rubber of the envelope extends beneath the flange 14 and thus a locking rib 16 of rubber extends completely around the member 11 and engages the under side of the flange 14. In the manufacture of the markers the parts remain in the mold while the rubber is being vulcanized. Thus, when the molded marker is removed, the lip 16, as well as the other parts, firmly adhere to the metal of the core. When it comes to the openings 15, then the rubber during the process of molding is pressed through the openings and still further secures the envelope to the core. In the case of the opening at the left in Fig. 2, the rubber within the opening joins the mass of rubber above the member 10 to the mass of rubber below it. Thus, the rubber within the opening constitutes a sort of tendril or stem which connects the rubber above to the rubber below. This mass to mass connection is also illustrated in Fig. 3 which illustrates the modified core B′. In case the envelope did not extend along the under side of the member 10 far enough to come opposite the openings 15 then the rubber pressed through the opening would in each instance form a mass 17 which would act, when finally vulcanized, as a retaining head. In this instance, the head 17 of rubber would be connected by the tendril or stem to the mass of rubber on the other side of the member 10. This rivet form of connection is illustrated also, perhaps more clearly in the modified core B², shown in Fig. 4, although in the latter instance the opening is not cylindrical, but countersunk from the under side.

The boss 12 may be interiorly threaded for the reception of an anchor bolt 18 forming part of the anchoring device C. The opposite end of the bolt 18 may be attached to a block 19 for anchoring purposes. The block 19, as here shown, is provided with a central opening 20 which is threaded for the reception of the threaded lower end of the bolt 18. The anchoring device may be greatly varied. That shown is merely typical. The same in itself forms no part in the present invention.

As before indicated the metal head or core may be modified considerably in construction. The form having the offset flange 14 is preferable, but in some instances it may be sufficient to have a flat plate for the auxiliary member. Such a plate, designated 21, forms part of the modified core $B^2$, illustrated in Fig. 4. Here the outer edge of the auxiliary plate extends at right angles to the plane of the member 10 and forms a vertical peripheral wall against which the rubber of the envelope A is adapted to press during the molding operation. In this instance the member 21 does not provide a flange or overhanging portion to obstruct the movement of the rubber of the envelope away from the surface of the member 10 but does, nevertheless, engage the rubber at its upper surface and by the adherence of the rubber to the metal, offers a certain resistance to the withdrawal of the rubber in a direction transverse to the plane of the member 10. The vertical wall formed at the periphery of the plate 21 does, however, offer decided resistance to any movement of the envelope in the direction of the plane of the member 10.

As a form intermediate between the plate 21 and the flanged member 11, we may in some instances provide a plate like the plate 22 forming part of the core B', illustrated in Fig. 3. This plate 22 has a beveled outer edge 23. The wall provided by the beveled edge 23 is inclined upwardly and outwardly and in this way provides with the member 10 a groove into which the rubber of the envelope A is pressed at the time of manufacture. Thus, in this instance there is a small rib underlying the projection formed by the beveled edge 23 and in character it is like the rib 16 of the preferred form of the invention but obviously is smaller and consequently less effective. The plate 22 also extends above the member 10 and thus offers resistance to any tendency of the envelope to move with reference to the core in the direction of the plane of the member 10.

As a further modification, we may also change the shape of the openings 15 through the member 10. One such change is illustrated in Fig. 4 where the opening, designated 24, has inclined walls which diverge downwardly. In other words, this is an opening which is countersunk from the under side. The effect of changing the opening this way is to increase the size of the stem or tendril which connects the head 17 with the body of the rubber. Obviously, other changes in the shape of these tendril openings might be made without departing from the scope of the invention.

Again, the anchoring device might be differently connected to the boss on the under side of the member 10. An illustration of such a modification is present in Fig. 5. There the boss, designated 25, is exteriorly threaded for the reception of a tubular anchoring device C', comprising a tube 26 interiorly threaded at its upper end.

These different modifications illustrate possible variations in carrying out the general features of the invention and thus indicate to some extent its scope. We do not wish to be limited to the exact forms of the invention illustrated, but desire to cover all alterations and modifications which rightly come within the spirit and scope of our invention. To this end we employ comprehensive terms in the appended claims.

What we claim as new and desire to secure by a patent of the United States is:

1. A pavement marker comprising a main supporting metal plate having a boss struck out from it on its under side, said boss having a central bore and being provided with means for attachment to an anchor, a secondary plate secured to the upper side of said main plate to close the end of said bore, the upper surface of said secondary plate at its periphery being higher than the upper surface of said main plate at that point, and an envelope of rubber overlying the upper side of said plates and terminating at its periphery in a pavement contacting lip extending beyond the periphery of said main plate.

2. A pavement marker comprising a main supporting metal plate of regular symmetrical contour having a boss struck out from its center on its under side, said boss being provided with means for attachment to an anchor, a secondary plate of like symmetrical contour but smaller than said main plate secured to the upper side of said main plate concentrically therewith, the periphery of said secondary plate having retaining portions spaced from said main plate, and an envelope of rubber overlying the upper side of said plates and embracing the periphery of said main plate and being locked in part to said plates by said retaining portions of said secondary plate and in part by the periphery of said main plate.

3. A metal core for a pavement marker comprising a main metal plate having an integral boss struck out from the same on its under side, the formation providing a hole through said boss, and a second metal plate secured to the upper side of said main plate and closing one end of said opening and extending at its upper edge or edges to an elevation above that of said main plate.

4. In a pavement marker, a flat plate having an integral boss struck out from the same on its under side, the formation providing a bore extending at right angles to the plane of said plate, and a second metal plate secured to said first mentioned plate about said bore and having peripheral edges encircling said bore and upwardly off-set from said first mentioned plate to provide engaging portions for the rubber envelope of the marker.

5. A pavement marker comprising a head of metal of regular symmetrical contour provided with a row of perforations near its periphery extending completely through the length of said periphery, an envelope of rubber enclosing all of said head except a central area on its under side, the rubber on the upper face of said head constituting a thick resilient cushion, the rubber at the edge of said head extending only slightly beyond it and forming a thick peripheral cushion for the blows of traffic, and the rubber on the under side of said head being a relatively thin sheet, said envelope having binding portions of rubber extending through said perforations, said binding portions being integral with the portions of the envelope above and below said head, and means rigidly secured to said head for securing said head to the pavement against appreciable up and down movement by the traffic.

6. A pavement marker comprising a flat plate having an integral boss on its under side, said boss having a bore extending at right angles to the plane of said plate, said plate being provided with a row of perforations near its periphery, a second plate secured to said first mentioned plate about said bore and having peripheral edges encircling said bore and upwardly off-set from said first mentioned plate to provide engaging portions inwardly of the periphery of said first mentioned plate, an envelope of rubber enclosing said plates except a central area on the under side of said first mentioned plate, the rubber on the upper side of said plates constituting a thick resilient cushion, the rubber at the edge of said envelope extending only slightly beyond the edge of said first mentioned plate and forming a peripheral cushion and the rubber on the under side of said first mentioned plate being a relatively thin sheet, said envelope being locked into the engaging portions of said second plate and having near its periphery binding portions of rubber extending through the perforations in said first mentioned plate, said binding portions being integral with the portions of the envelope above and below said plates, and means for connecting the marker to the pavement by a connection with said boss.

7. A pavement marker comprising a main supporting metal plate having a boss on its under side, said boss being provided with means for attachment to an anchor and said main plate having a row of perforations near its periphery, a secondary plate secured to the upper side of said main plate, the periphery of said secondary plate having retaining portions spaced from said main plate, and an envelope of rubber enclosing said plates except a central area on the under side of said main plate, and being locked in part to said plates by the retaining portions of said secondary plate, the rubber of the upper part of the envelope above said plates constituting a thick resilient cushion, the rubber at the edge of the envelope extending only slightly beyond the periphery of said main plate and forming a peripheral cushion and the rubber beneath said main plate being a relatively thin sheet, said envelope having binding portions of rubber extending through said perforations in said main plate, said binding portions being integral with the portions of the envelope above and below said plates.

8. A pavement marker comprising a main supporting metal plate having a boss on its under side, said boss having a central bore and being provided with means for attachment to an anchor, said main plate having a row of perforations near its periphery, a secondary plate secured to the upper side of said main plate to close the end of said bore and having peripheral edges upwardly off-set from said main plate to provide engaging portions inwardly of the periphery of said main plate, and an envelope of rubber enclosing said plates except a central area on the under side of said first mentioned plate, the rubber on the upper side of said plates constituting a thick resilient cushion, the rubber at the edge of said envelope extending only slightly beyond the edge of said first mentioned plate and forming a peripheral cushion and the rubber on the under side of said first mentioned plate being a relatively thin sheet, said envelope being locked into the engaging portions of said second plate and having near its periphery binding portions of rubber extending through the perforations in said first mentioned plate, said binding portions being integral with the portions of the envelope above and below said plates.

9. A pavement marker comprising a main supporting metal plate having a boss on its under side, said boss having a central bore and being provided with means for attachment to an anchor, a secondary plate secured to the upper side of said main plate to close the end of said bore and having peripheral edges upwardly off-set from said main plate to provide engaging portions inwardly of the periphery of said main plate, and an envelope of rubber overlying the upper side of said plates and being locked into the said engaging portions of said secondary plate and terminating at its periphery in a peripheral cushion extending slightly beyond the periphery of said main plate.

10. A pavement marker comprising a head of metal of regular symmetrical contour provided with perforations arranged in an annular series, an envelope of rubber enclosing all of said head except a central area on its under side, the rubber on the upper face of said head constituting a thick resilient cushion, the rubber at the edge of said head extending only slightly beyond it and forming a peripheral cushion of a thickness in the plane of said head approximately equal to the thickness of said envelope on the upper face of said head, and the rubber on the under side of said head being a relatively thin sheet, said envelope having binding portions of rubber extending through said perforations, said binding portions being integral with the portions of the envelope above and below said head, and means rigidly secured to said head for securing said head to the pavement against appreciable up and down movement by the traffic.

In testimony whereof we hereunto subscribe our names this 24th day of September, 1928.

MELVIN E. HARTZLER.
EDGAR P. ROMILLY.